Dec. 29, 1964   H. O. ROSENBERG   3,162,915
BUCKLES FOR SAFETY BELTS
Filed March 28, 1962 ent Office 3,162,915
Patented Dec. 29, 1964

3,162,915
BUCKLES FOR SAFETY BELTS
Herbert Olof Rosenberg, Vikstensvagen 41,
Johanneshov, Sweden
Filed Mar. 28, 1962, Ser. No. 183,170
Claims priority, application Sweden, Mar. 30, 1961,
3,430/61
3 Claims. (Cl. 24—196)

The present invention relates to buckles for safety belts, wherein the length of the belt is adjustable, which buckle is made in the shape of a frame having an aperture in which a bar is displaceable in the direction of pull of the belt and which bar is adapted to clamp the belt against one of the edges of the frame aperture.

Such buckles are commonly known and used in safety belts for motor vehicles, where the pulling stress in the belt will reach very high values in cases of emergency. Thus it is of great importance that the hazard of slipping of the belt in the buckle be eliminated as far as possible.

It is an object of the invention to provide a buckle for a safety belt in which efficient clamping of the buckle is obtained while adjustment of the length of the belt is greatly facilitated.

According to the invention there is provided a clamping strip in a buckle adapted for cooperating with a belt and wherein the buckle has a part of frame shape which is provided with an aperture and a bar in said aperture. The bar is supported by the buckle for displacement in the aperture in a direction of pull of the belt to clamp the belt against the frame bounding the aperture. The clamping strip is curved and is adapted for contacting the bar. The belt is adjustable in length and two portions of the belt are in face-to-face relation outside the aperture and a loop of the belt passes around the bar and the clamping strip for holding the strip in contact with the bar. The clamping strip extends beyond opposite ends of the bar to define finger grips, and the strip is engageable at the finger grips, to be displaced away from the bar to increase the size of the loop of the belt to permit adjustment of the length of the belt.

In further accordance with the invention, a shield is provided on end portions of the strip on a side thereof away from the bar for laterally bounding the belt to retain the strip between the belt and the bar.

It is a further feature of the invention that end portions of the shield cooperate with the end portions of the strip to enlarge the finger grips provided thereby.

An embodiment of the invention is shown in the annexed drawing, wherein

Figure 1:
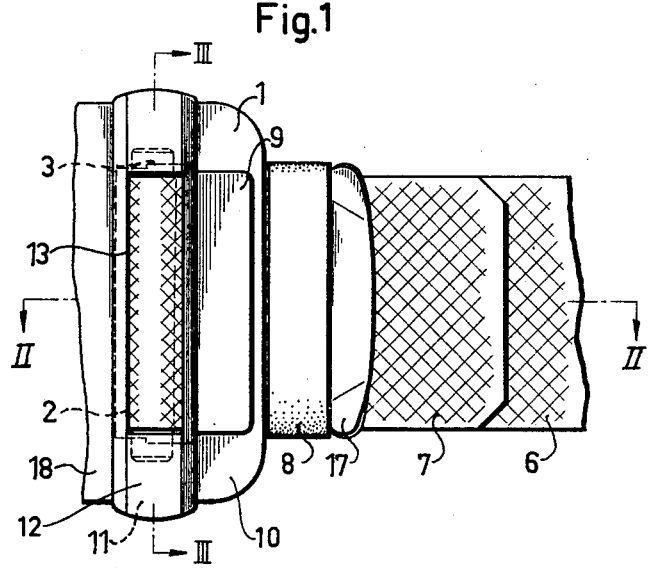
FIG. 1 is a plan view of a portion of the buckle with a belt inserted therein.
Figure 2:
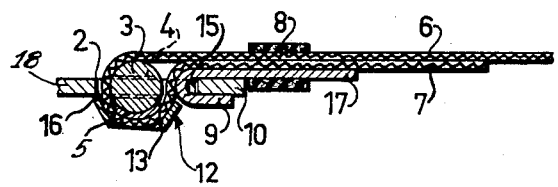
FIG. 2 is a section taken along the line II—II in FIG. 1.

A frame-like buckle member 1 is provided in a manner known per se with an essentially rectangular aperture 2 and with a bar 3 which extends across said aperture and is displaceable in its transverse direction and either end part of which has a diametrical slit 4. The bar is so arranged that the buckle member at two opposite edges of the aperture engages said slits.

According to the invention, along one side of the bar there is arranged a metal strip 5 of an arc-shaped cross-section. The strip is closely fitted to the bar and embraces the same partially, so that the bar and the strip form together a rod-shaped body, two opposite cylindrical side faces of which are of different radii.

One part of the belt is designated by 6 and the other part by 7. A loop of the belt is placed around the bar and the strip in such a manner that the two belt parts are situated face-to-face on one side of the buckle and are held together by a resilient strap 8.

The belt part 6 is adapted to transfer the pulling load which causes the bar to be displaced in the direction of the pull to clamp the portion of the belt part 7 adjacent the loop into contact with one of the longitudinal edges of the buckle bounding the aperture 2. In the embodiment shown, said edge is formed by a folded protection plate 9 having straight legs bearing against opposite sides of the frame part 10 of the buckle. Therefore, the belt will be clamped between the bar and a rounded back part of the plate 9 when stress is exterted on the belt part 6. The strip 5 is sufficiently thick and wide to cause the belt loop to bulge out and form an S-shaped curve close to the pressure zone obtained by means of the bar 3, the belt being clamped between the bar 3 and the back part of the plate 9 as well as between the strip 5 and said back part, i.e., along two parallel zones.

Figure 3:
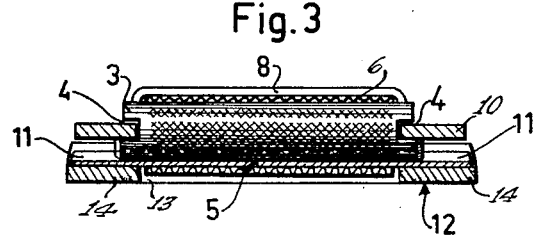
FIG. 3 is a section taken along the line III—III in FIG. 1.

The strip 5 extends beyond the ends of the bar, as shown in FIG. 3, far enough to form finger grips 11, by means of which the strip can easily be separated from the bar and drawn down a desired distance, thereby extending the belt loop in order to adjust the length of belt. The strip is returned into engagement with the bar either by pulling the belt part 6, in which case the belt is lengthened, or by pulling the belt part 7, in which case the belt is shortened.

In order to secure the strip 5 to the belt so that it may slide along the belt but cannot be removed therefrom, the end parts of the strip 5 are fastened to a shield 12 of such a shape as to keep the belt in contact with the strip. In the embodiment shown, said shield is formed with a preferably rectangular aperture 13 having a length which corresponds to the width of the belt and a width which is substantially equal to the width of the strip. Two longitudinal edge parts 14 of the shield 12 run closely along the longitudinal edge parts of the strip 5 and bound the aperture 13. The aperture 13 facilitates the introduction of the belt around the strip. The shield 12 can be so designed as to enlarge and improve the finger grips 11 at the end parts of the strip.

When the belt is not loaded, for instance when it is suspended on the wall of the vehicle in a position of readiness, as by placing the buckle member 1 upon a hook, the belt parts 6 and 7 should be held fixed in their relative position, so that the length of the belt is not changed by an inadvertent pull in the belt part 7. To this end a spring 15 is accommodated between the frame part 10 and the back part of the protection plate 9, which spring tends to push said plate towards the bar 3, thereby displacing the latter towards the normally free edge 16 of the frame aperture. Said spring effects clamping of the belt loop when the belt is not loaded, thereby preventing inadvertent changing of the length of the belt. Moreover the loop is maintained in position by the strap 8 enclosing the two belt parts as well as a prolonged part of the leg 17 of the protection plate 9.

The buckle member 1 may be rigidly connected to a second belt of a fixed length, in which case the frame part 18 bounding edge 16 is made with a slit-like aperture in known manner for accommodating said second belt (not shown).

What I claim is:

1. A buckle for an adjustable length belt, wherein the buckle has a member of frame shape which is provided with an aperture and a bar in said aperture, said bar being supported by said buckle member for displacement in said aperture in a direction of pull of the belt to clamp the belt against the frame bounding said aperture, a curved clamping strip adapted for contacting said bar, said belt having portions in face-to-face relation outside said aperture and a loop passing around the bar and the clamping strip for holding said strip in contact with the bar, said bar having opposite ends, said clamping strip extending beyond the ends of the bar to define finger grips, said strip being engageable at said finger grips to be displaced away from said bar to increase the size of said loop of the belt to permit adjustment of the length of belt.

2. The buckle as claimed in claim 1, wherein said strip has end portions and wherein siad buckle comprises a shield having portions on said end portions of the strip on the side of the strip away from said bar for laterally restricting said belt to retain the strip between the belt and the bar.

3. The buckle as claimed in claim 2, wherein said shield portions cooperate with the end portions of the strip to enlarge said finger grips.

References Cited in the file of this patent

UNITED STATES PATENTS

| | | |
|---|---|---|
| 2,542,044 | Miller et al. | Feb. 20, 1951 |
| 2,752,560 | Warner et al. | July 17, 1956 |